June 21, 1949.  C. C. STUART  2,473,830
MOTORCAR CARRIER
Filed Aug. 8, 1946  6 Sheets-Sheet 1
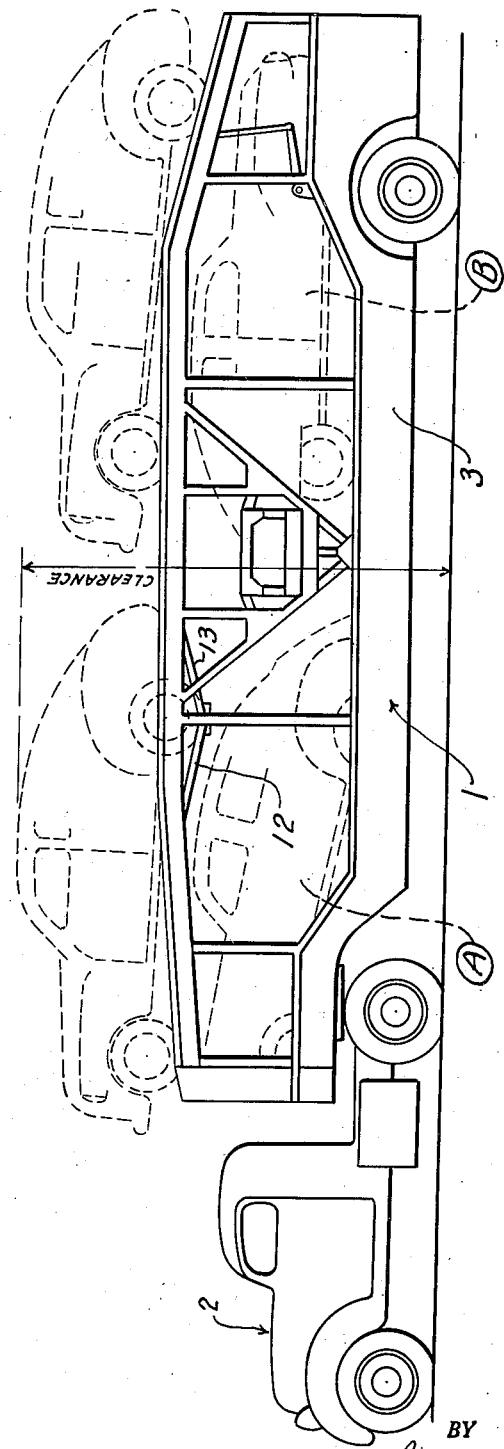
INVENTOR.
Clarence C. Stuart
BY
ATTORNEYS June 21, 1949. C. C. STUART 2,473,830
MOTORCAR CARRIER
Filed Aug. 8, 1946 6 Sheets-Sheet 2
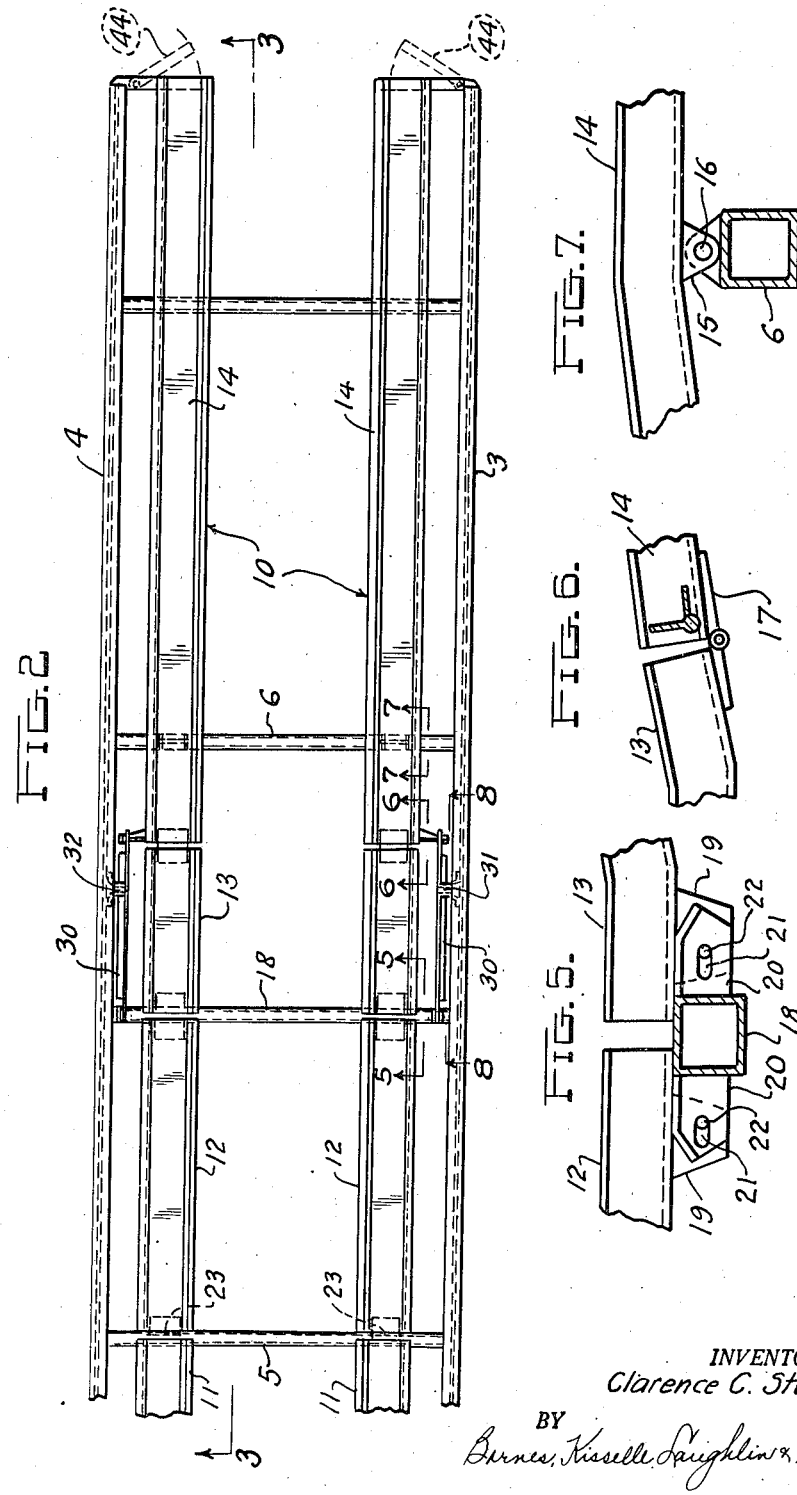
INVENTOR.
Clarence C. Stuart
BY
Barnes, Kisselle, Laughlin & Raisch
ATTORNEYS

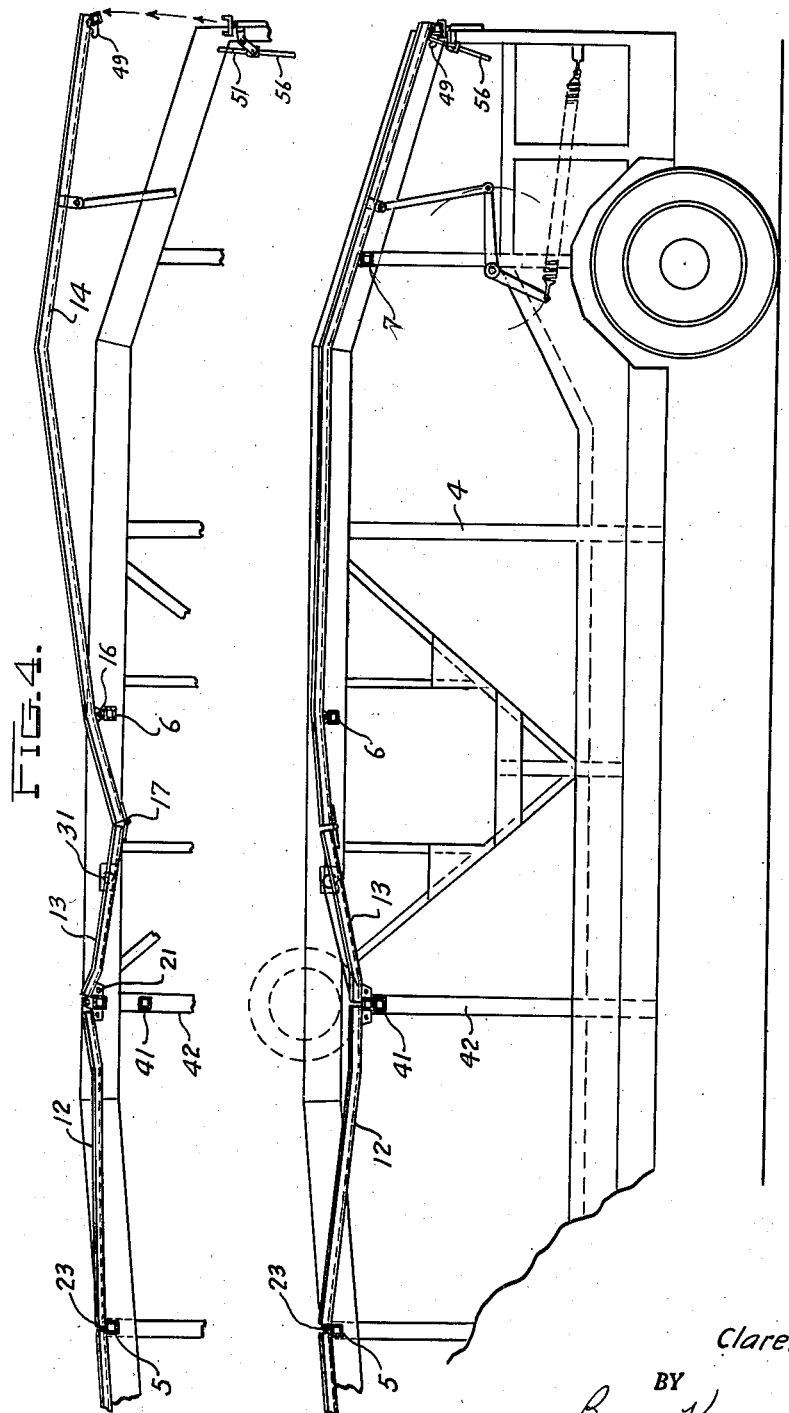

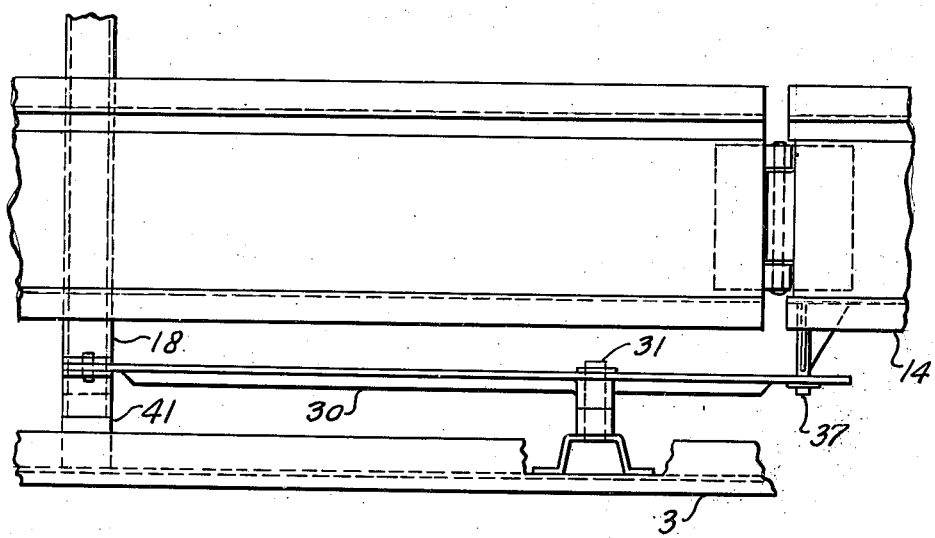
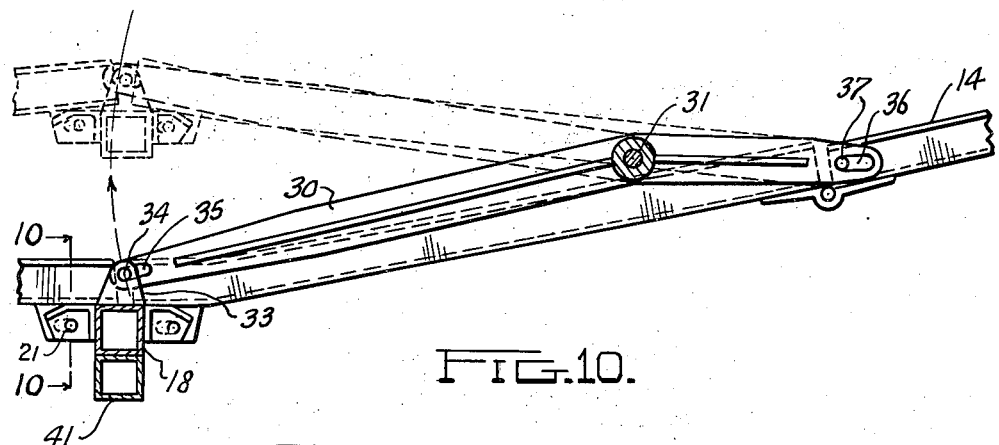
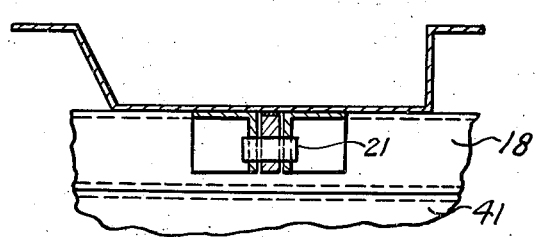

June 21, 1949.　　　C. C. STUART　　　2,473,830
MOTORCAR CARRIER
Filed Aug. 8, 1946　　　　　　　　　　6 Sheets-Sheet 5
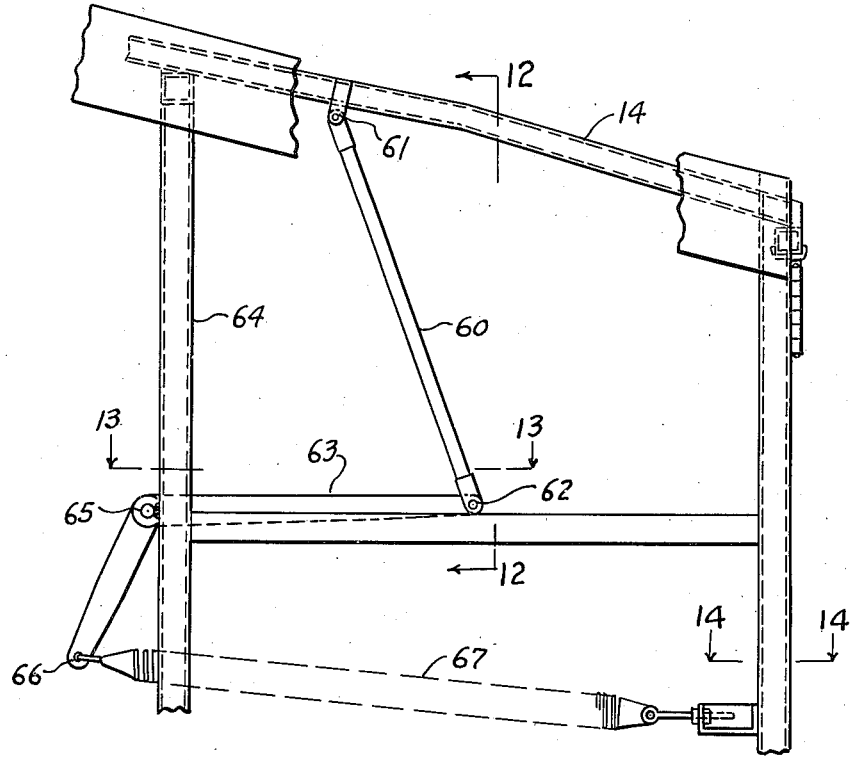
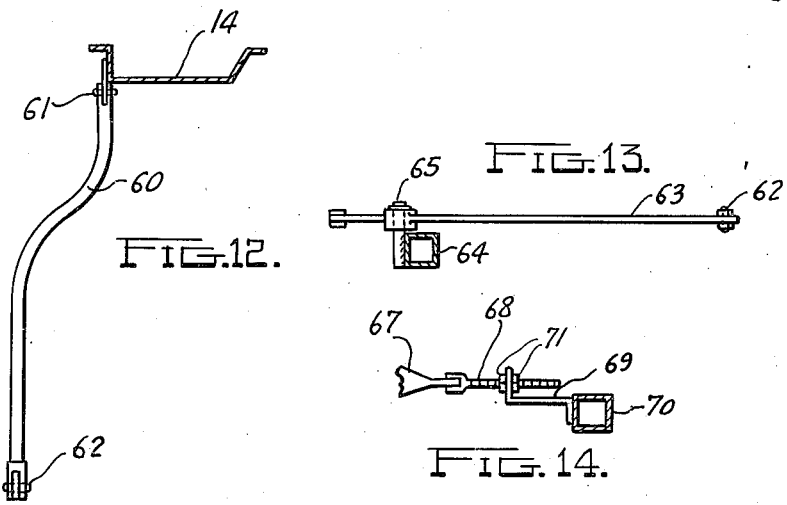
INVENTOR.
Clarence C. Stuart
BY
ATTORNEYS June 21, 1949.    C. C. STUART    2,473,830
MOTORCAR CARRIER Filed Aug. 8, 1946    6 Sheets-Sheet 6

INVENTOR.
Clarence C. Stuart
BY
Barnes, Kisselle, Laughlin & Raisch
ATTORNEYS

Patented June 21, 1949

2,473,830

UNITED STATES PATENT OFFICE 2,473,830

MOTORCAR CARRIER

Clarence C. Stuart, Dearborn, Mich., assignor to Traffic Transport Engineering, Inc., Dearborn, Mich., a corporation of Michigan Application August 8, 1946, Serial No. 689,122

10 Claims. (Cl. 296—1)

This invention relates to a vehicle and more particularly to a vehicle for transporting other vehicles.

It is common practice to haul a plurality of automotive vehicles upon a single trailer or truck. In so doing it is necessary to observe various State laws relating to overall length of the carrier and the vertical clearance of the same. The observance of such laws makes it necessary to load the motor carrier or trailer very compactly.

It is an object of this invention to produce a carrier for motor vehicles which is of simple structure, which can be easily and efficiently loaded, and which will carry a maximum number of motor vehicles within a given overall length and height.

Fig. 1 is a side elevation showing my vehicle carrier.

Fig. 2 is a top plan view of the same.

Fig. 3 is a section along the line 3—3 of Fig. 2 showing the position of the upper tracks when the trailer is loaded.

Fig. 4 is a sectional view similar to Fig. 3 but showing the position of the upper tracks during the loading of the lower floor of the trailer.

Figs. 5, 6, 7 and 8 are sections along the lines 5—5, 6—6, 7—7 and 8—8 of Fig. 2.

Fig. 9 is a fragmentary top view of a portion of the upper track.

Fig. 10 is a section along the line 10—10 of Fig. 8.

Fig. 11 is a fragmentary side elevation of the rear end of the trailer.

Figs. 12, 13 and 14 are sections along the lines 12—12, 13—13 and 14—14 of Fig. 11.

Figure 15:
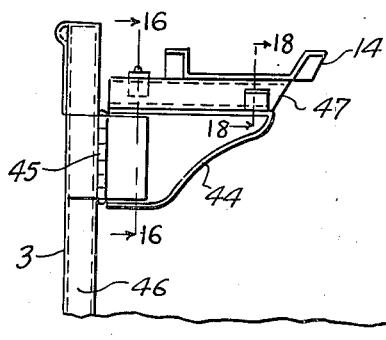

Fig. 15 is a fragmentary rear elevation showing the upper tracks of the trailer.

Figure 16:
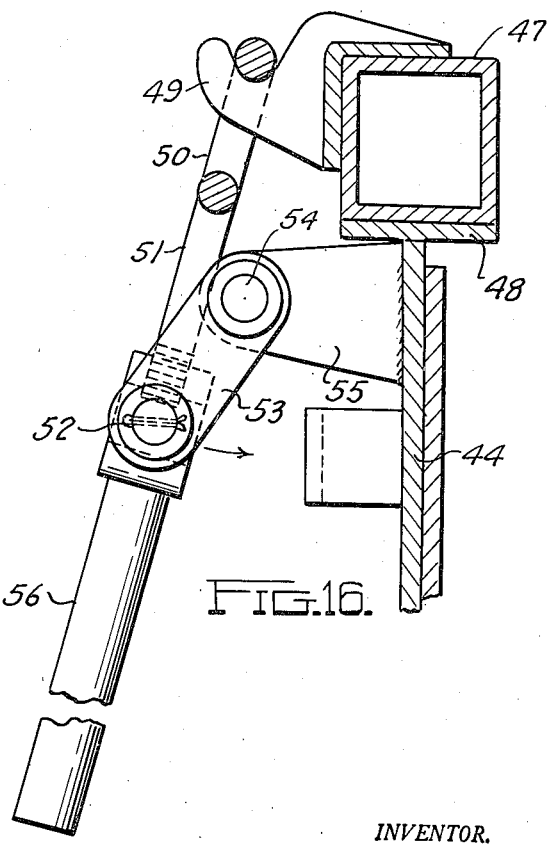

Fig. 16 is a section along the line 16—16 of Fig. 15.

Figure 17:
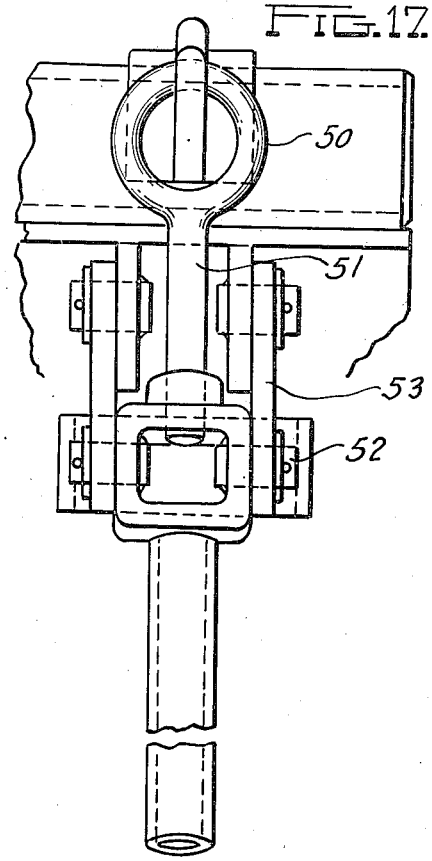

Fig. 17 is a detail of the toggle clamp at the rear end of the trailer.

Figure 18:
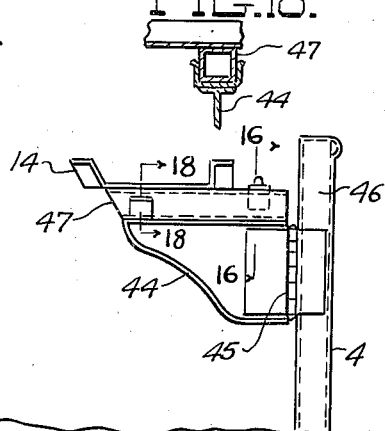

Fig. 18 is a section along the line 18—18 of Fig. 15.

Referring more particularly to the drawings I have shown my carrier in the form of a semi-trailer, generally designated 1, which is drawn by a tractor, generally designated 2. My trailer comprises conventional open framework, preferably of steel, comprising sides 3 and 4, upper cross rails 5 and 6 fixed at their opposite ends to sides 3 and 4.

My trailer is arranged to carry four motor cars, as shown in Fig. 1, two cars on the lower track or floor of the trailer and two cars on the upper track. It will be noted that the forwardmost motor car carried on the lower track cannot be placed on the trailer in the position shown or removed therefrom without removing the upper track from the pathway of such motor car. Thus, to facilitate the locating of the upper motor cars closely above the lower motor cars on the trailer so as to obtain an overall height between the top of the uppermost motor car and the road which will satisfy the various State regulations, I have provided an upper trackway which can be readily moved out of the way to facilitate loading of a motor car in the front end of my trailer.

Referring to Figs. 2 and 3, it will be seen that each upper track, which is generally designated 10, comprises four sections referenced 11, 12, 13 and 14. Each section 14 is hinged upon cross rail 6 by hinge 15 and pin 16. Each track section 13 is hinged at its rear end to the forward end of track section 14 by hinge 17, the butts of which are welded or otherwise fixed to tracks 13 and 14 respectively. The forward end of each track section 13 and the rear end of each track section 12 rests upon adjustable cross rail 18 and has a sliding connection therewith. This connection in each case takes the form of a bracket 19 fixed to the underside of track 13, a bracket 20 fixed to rail 18 having an elongated slot 21 therein which interengages pin 22 fixed on bracket 19. A bracket 19 is also fixed to the rear end of section 12 and a bracket 20 secured to the forward face of bar 18 for connecting track section 12 to bar 18. The lost motion connection between brackets 19 and 20 is necessary to accommodate the relative movement between rail 18 and track sections 12 and 13 as they are adjusted up and down. The forward end of track section 12 is hinged as at 23 to cross rail 5. Track sections 11 are fixedly mounted upon rails 5 and the front cross rail (not shown) of the trailer.

Cross rail 18 is supported at each end upon a lever 30. Levers 30 are pivoted upon sides 3 and 4 of the trailer by pins 31 and 32 respectively. Each lever 30 at its forward end has a pivotal lost motion connection with rail 18 in the form of a bracket 33 fixed on rail 18 carrying a pin 34 which interengages lever 30 in elongated slot 35. The rear end of each lever 30 is pivotally connected to the forward end of track section 14 by means of pin 37 fixed on track 14 which engages lever 30 in the elongated slot 36.

In its lowered position rail 18 is supported at its opposite ends by stops 41 which are welded or otherwise secured to posts 42 forming a part of side walls 3 and 4. Stops 41 only project a small distance inwardly from sides 3 and 4 so that they will clear any vehicle being loaded or unloaded on the lower trackways. Preferably rail 18 is tied to stops 41 by the toggle tie-down assembly such as shown in Figs. 16 and 17. This same tie-down assembly is used for tying down the rear end of track sections 14 which, in their lowered position, rest upon supports 44 hinged as at 45 on a vertical axis to posts 46.

A tubular leg 47 is welded or otherwise affixed to the rear end of track section 14. In lowered position leg 47 rests upon the upper face 48 of hinged stop 44. Leg 47 has a keeper 49 welded or otherwise fixed thereto which interengages eye 50 of toggle link 51 which is pivotally connected by pin 52 to toggle link 53. Toggle link 53 is pivoted by pin 54 upon bracket 55 fixed to support 44. By swinging toggle handle 56 to the right, Fig. 16, pin 52 swings to the right of pin 54 and securely locks leg 47 and rail 14 to hinge support 44. When loading the vehicle, supports 44 are unlocked from tracks 14 and swing either inwardly or outwardly of sides 3 and 4 to provide clearance for the motor cars while being loaded on the trailer.

Each rail section 14 is provided with a counterbalancing mechanism in the form of link 60 pivoted as at 61 to section 14 and as at 62 to one end of bell crank lever 63. Bell crank lever 63 is pivotally supported on post 64 by pin 65. The other end of bell crank lever 63 is connected as at 66 to one end of a coil tension spring 67. The other end of spring 67 is pivotally connected to threaded rod 68 which is adjustably mounted in bracket 69 carried by rear post 70. The tension on spring 67 can be adjusted by turning member 68 and locking it in position by lock nuts 71. Thus, it will be seen that counterbalancing spring 67 acts through bell crank 63 and link 60 to counterbalance the weight of track section 14 and tends at all times to raise the same. It is, of course, appreciated that there will be a counterbalancing mechanism (60, 63, 67) on each side of the carrier for each track section 14. Each track section 14 will be locked down in normal position by means of a toggle latch such as shown in Figs. 16 and 17.

In loading my carrier the two motor cars, designated A and B, on the lower floor are loaded first. To load cars A and B it is first necessary to disengage the toggle tie-down latches holding down the rear end of tracks 14 and holding down cross rail 18. After the toggle tie-downs are released track sections 14 are swung upwardly about pivots 16 to the position shown in Fig. 4 and are held in this position by the counterbalancing mechanism (60, 63, 67). The swinging upwardly of track section 14 swings levers 30 clockwise about their pivot pins 31, Figs. 8 and 9, which elevates track sections 12 and 13 from the position shown in Fig. 3 to that shown in Fig. 4. Hinge supports 44 are swung either rearwardly or forwardly flush against sides 3 and 4 so that they are out of the way of cars A and B. Elevation of sections 14 to the position shown in Fig. 4 places track rails 14 in the position where they will clear the roofs of vehicles A and B and elevation of rail 18 above stops 41 also places rail 18 and track sections 12 and 13 in a position where they will clear the top of car A as it is rolled into place.

After cars A and B have been placed in the position shown in Fig. 1, then supports 44 are swung inwardly perpendicular to side walls 3 and 4, Fig. 15, and track sections 14 lowered and latched to supports 44. Lowering of sections 14 swings lever 30 counterclockwise, Fig. 8, from the dotted to the full line position so that cross bar 18 rests upon stops 41 and track sections 12 and 13 are lowered, as shown in Fig. 1, and are now in position to receive the two top cars which are loaded in the position shown in Fig. 1. Bar 18 will be latched to supports 41 as above described. As section 12 swings from the position shown in Fig. 3 to that shown in Fig. 4 and vice versa, section 12 pivots about hinge 23. Thus, each top trackway has three fixed pivots; namely, 23, 31 and 16, and two movable hinge connections; namely, hinge 17 and hinge connections 21, 22, which move up and down as the track sections are raised and lowered.

I claim:

1. In a carrier for wheeled vehicles of the type having upper and lower decks for carrying motor cars one above the other, the combination of two upper tracks comprising the upper deck, each upper track comprising a plurality of articulated longitudinally aligned sections, each upper track having portions which are normally positioned relative to said lower deck a distance such that they will not clear a motor vehicle being rolled into position upon said lower deck, a plurality of pivotal supports for the sections of each track, the pivotal support for an end section of each track being spaced intermediate the ends of said section whereby said end section can be swung about said pivot and serve as a lever for moving other sections of the track so that the said portions of said track will be elevated sufficiently to clear a motor vehicle being loaded on the lower deck.

2. In a carrier for wheeled vehicles of the type having upper and lower decks for carrying motor cars one above the other, the combination of two upper tracks comprising the upper deck, each upper track comprising a plurality of articulated longitudinally aligned sections, pivotal supports for the rearmost and another of said sections, the said pivotal support for the rearmost of said sections being fixed and positioned rearwardly of the front end of said section, the pivotal support for said other section being positioned intermediate the ends of said other section whereby said rearmost section can be swung about said pivot and serve as a lever for raising and lowering the ends of said other section of said track to facilitate loading and unloading of the carrier.

3. In a carrier for wheeled vehicles of the type having upper and lower decks for carrying motor cars one above the other, the combination of two upper tracks comprising the upper deck, each upper track comprising three articulated longitudinally aligned sections, a fixed pivotal support for an end section, a pivotal support for the intermediate section, said pivotal supports being positioned intermediate the ends of said sections whereby the outer end of said end section can be swung upwardly to clear a motor vehicle being moved on to the lower deck, and means connecting the inner end of said end section with said intermediate section, said end section serving as a lever for actuating portions of the other two sections upwardly to a position where they also will clear a motor vehicle being moved on to the lower deck when the outer end of said end section is swung upwardly.

4. In a carrier for wheeled vehicles of the type having upper and lower decks for carrying motor cars one above the other, the combination of two upper tracks comprising the upper deck, each upper track comprising three longitudinally aligned sections, the intermediate section being pivotally connected at its front end to the rear of the front section and at its rear end to the front of the rear section, a fixed pivotal support for the rear section, a lever, a pivotal support for said lever, said lever being pivotally connected to the front end of the rear section and to one of said other sections whereby when the rear section is swung upwardly about its pivot said lever is actuated thereby about its pivotal support to elevate the front and intermediate sections whereby all of said sections will clear a motor car being loaded upon the lower track.

5. In a carrier for wheeled vehicles of the type having upper and lower decks for carrying motor cars one above the other, the combination of two upper tracks comprising the upper deck, each upper track comprising longitudinally aligned front, intermediate and rear track sections, a fixed pivotal support for the front end of said front section, a fixed pivotal support for the rear section and positioned intermediate the ends of said rear section, a pivotal connection between the front end of the rear section and the rear end of the intermediate section, said pivotal connection swinging downwardly when the rear section is swung upwardly about its pivot, a pivotal connection between the front end of the intermediate section and the rear end of said front section, said last pivotal connection moving upwardly when the rear section is elevated to clear a motor car being moved on to the lower deck, a third pivotal support, and lever means pivoted on said last named support and connected to and actuated by said rear track section for raising the pivotal connection between the front and intermediate track sections when the rear track section is elevated whereby the pivotal connection between the front and intermediate track sections will also clear a vehicle being moved on to the lower deck.

6. The combination as set forth in claim 5 wherein the pivotal connection between the front and intermediate track sections comprises a cross bar having a lost motion pivotal connection with the front and intermediate sections whereby the bar travels upwardly and downwardly when the track sections are swung into and out of their normal positions for loading of motor cars.

7. The combination as set forth in claim 5 wherein the pivotal connection between the front and intermediate track sections comprises a cross bar having a lost motion pivotal connection with the front and intermediate sections whereby the bar travels upwardly and downwardly when the track sections are swung into and out of their normal positions for loading of motor cars, and stops for supporting said cross bar when the track sections are lowered to their normal car receiving position.

8. In a carrier for wheeled vehicles of the type having upper and lower decks for carrying motor cars one above the other, the combination of two upper tracks comprising the upper deck, each upper track comprising longitudinally aligned front, intermediate and rear track sections, a fixed pivotal support for the front end of said front section, a fixed pivotal support for the rear section and positioned intermediate the ends of said rear section, a pivotal connection between the front end of the rear section and the rear end of the intermediate section, said pivotal connection swinging downwardly when the rear section is swung upwardly about its pivot, a pivotal connection between the front end of the intermediate section and the rear end of said front section, said last pivotal connection moving upwardly when the rear section is elevated to clear a motor car being moved on to the lower deck, a third fixed pivotal support, lever means on said last named support connected to and actuated by said rear track section for raising the pivotal connection between the front and intermediate track sections when the rear track section is elevated whereby the pivotal connection between the front and intermediate track sections will also clear a vehicle being moved on to the lower deck, and removable supports for supporting the rear ends of said rear track sections when lowered to their normal car supporting position.

9. In a carrier for wheeled vehicles of the type having upper and lower decks for carrying motor cars one above the other, the combination of two upper tracks comprising the upper deck, each upper track comprising front, intermediate and rear track sections, a fixed pivotal support for the front end of said front track section, a fixed pivotal support intermediate the ends of said rear track section, a pivotal connection between the front end of the rear section and the rear end of the intermediate section, a cross bar between the front and intermediate sections, a loose pivotal connection between the cross bar and the front end of the intermediate section and the rear end of the front section, a lever, a fixed pivotal support for said lever intermediate the ends of the same, a pivotal connection between one end of the lever and the front end of said rear section, a pivotal connection between the other end of the lever and said cross bar whereby when the rear track section is swung about its pivot it simultaneously swings said lever to thereby change the elevation of said cross bar which simultaneously swings the front section about its fixed pivot and the intermediate section about its pivotal connection with the rear section whereby each upper track can be swung out of its normal position to provide clearance for a motor car being loaded on the lower deck.

10. In a carrier for wheeled vehicles of the type having upper and lower decks for carrying motor cars one above the other, the combination of two upper tracks comprising the upper deck, each upper track comprising articulated, longitudinally aligned front, intermediate, and rear sections, said intermediate section being pivotally connected at its front end with the rear end of the front section and at its rear end with the front end of the rear section, a fixed pivotal support for the rear section, a fixed pivotal support for the intermediate section, said pivotal supports being positioned intermediate the ends of said sections and a fixed pivotal support for the front section positioned remotely from the pivotal connection between the front and intermediate sections whereby when the rear end of said rear section is elevated, the pivotal connection between the rear and intermediate sections is lowered and the pivotal connection between the intermediate and front sections is raised to provide clearance in the vicinity of the pivotal connection between the front and intermediate sections for loading and unloading a vehicle on said lower deck.

CLARENCE C. STUART.

REFERENCES CITED

The following references are of record in the file of this patent:

UNITED STATES PATENTS

| Number | Name | Date |
|---|---|---|
| 1,809,557 | Lishon | June 9, 1931 |
| 2,123,630 | Judd | July 12, 1938 |